US010215847B2

(12) United States Patent
Scheim et al.

(10) Patent No.: US 10,215,847 B2
(45) Date of Patent: Feb. 26, 2019

(54) PSEUDO RANDOM SEQUENCES IN ARRAY LIDAR SYSTEMS

(71) Applicant: GM Global Technology Operations LLC, Detroit, MI (US)

(72) Inventors: Kobi J. Scheim, Pardess Hanna (IL); Ariel Lipson, Tel Aviv (IL); Ran Y. Gazit, Ra'anana (IL); Oded Bialer, Petah Tikva (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 301 days.

(21) Appl. No.: 15/145,903

(22) Filed: May 4, 2016

(65) Prior Publication Data

US 2016/0327646 A1   Nov. 10, 2016

Related U.S. Application Data

(60) Provisional application No. 62/158,281, filed on May 7, 2015.

(51) Int. Cl.

| G01S 7/48 | (2006.01) |
|---|---|
| G01S 7/484 | (2006.01) |
| G01S 17/10 | (2006.01) |
| G01S 17/42 | (2006.01) |
| G01S 17/89 | (2006.01) |
| G01S 7/481 | (2006.01) |
| G01S 7/486 | (2006.01) |

(52) U.S. Cl.
CPC ............. *G01S 7/484* (2013.01); *G01S 7/4815* (2013.01); *G01S 7/4816* (2013.01); *G01S 7/4865* (2013.01); *G01S 17/102* (2013.01); *G01S 17/42* (2013.01); *G01S 17/89* (2013.01)

(58) Field of Classification Search
CPC .............................. G01S 17/325; G01C 3/08
See application file for complete search history.

(56) References Cited

U.S. PATENT DOCUMENTS

2011/0317147 A1*   12/2011   Campbell ............. G01S 17/325
356/5.09

* cited by examiner

*Primary Examiner* — Luke D Ratcliffe
(74) *Attorney, Agent, or Firm* — Cantor Colburn LLP

(57) ABSTRACT

A method of performing ranging and detection with an array lidar system and the array lidar system include a first illuminator to transmit a first pseudorandom binary sequence of pulses, the first pseudorandom sequence of pulses resulting in first reflections, and a second illuminator to transmit a second pseudorandom sequence of pulses, the second pseudorandom sequence of pulses being transmitted at least partly concurrently with transmission of the first pseudorandom sequence of pulses, the second pseudorandom sequence of pulses resulting in second reflections. A receiver receives the first reflections and the second reflections and associates the first reflections with the first illuminator based on a result of correlating the first reflections with the first pseudorandom sequence of pulses and a result of correlating the first reflections with the second pseudorandom sequence of pulses, the receiver includes an optical detector array and a processor.

17 Claims, 5 Drawing Sheets

US 10,215,847 B2

PSEUDO RANDOM SEQUENCES IN ARRAY LIDAR SYSTEMS

CROSS-REFERENCE TO RELATED APPLICATION

This application is a Non-Provisional of U.S. Provisional Application No. 62/158,281 filed May 7, 2015, the disclosure of which is incorporated herein by reference in its entirety.

FIELD OF THE INVENTION

The subject invention relates to pseudo random sequences in array lidar systems.

BACKGROUND

Lidar, which may be referred to as light radar or laser array light detection and ranging, refers generally to transmitting light at an object and receiving and processing a resulting reflection. An array of illuminators may be used in a lidar system to obtain reflections from a wider field of view than is possible with a single illuminator. While the illuminators of an array lidar may be used in turn, simultaneous transmission by the array may result in reflections that are not easily resolved at the receiver. Accordingly, it is desirable to provide an array lidar system that facilitates concurrent transmission and simplified processing of received reflections.

SUMMARY OF THE INVENTION

According to an exemplary embodiment of the invention, an array lidar system includes a first illuminator configured to transmit a first pseudorandom binary sequence of pulses, the first pseudorandom sequence of pulses resulting in first reflections; a second illuminator configured to transmit a second pseudorandom sequence of pulses, the second pseudorandom sequence of pulses being transmitted at least partly concurrently with transmission of the first pseudorandom sequence of pulses, the second pseudorandom sequence of pulses resulting in second reflections; and a receiver configured to receive the first reflections and the second reflections and associate the first reflections with the first illuminator based on a result of correlating the first reflections with the first pseudorandom sequence of pulses and a result of correlating the first reflections with the second pseudorandom sequence of pulses, the receiver including an optical detector array and a processor.

According to another exemplary embodiment, a method of performing ranging and detection with an array lidar system includes transmitting a first pseudorandom binary sequence of pulses (PRBS) using a first illuminator; transmitting a second PRBS using a second illuminator, the transmitting the first PRBS and the transmitting the second PRBS being at least partly concurrent; receiving first reflections resulting from the transmitting the first PRBS; receiving second reflections resulting from the transmitting the second PRBS; and associating the first reflections with the first illuminator based on a result of correlating the first reflections with the first PRBS and a result of correlating the first reflections with the second PRBS.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

As noted above, lidar systems are used for detection and ranging. Lidar systems have diverse applications in areas such as landslide investigations, archaeology, oil and gas exploration, meteorology, and navigation (e.g., obstacle detection) in automotive applications. As also noted, concurrently transmitting light from multiple illuminators of an array results in multiple reflections that must be resolved to remove ambiguity and obtain meaningful information. Prior array lidar systems have avoided the interference among reflections by transmitting from each illuminators of the array in turn in a time division multiple access (TDMA) scheme. Embodiments of the systems and methods discussed herein relate to concurrent transmission, with two or more illuminators of the array lidar, of pulse sequences that facilitate resolution or differentiation of the reflections associated with each illuminator on the receiver side. Specifically, the transmission from each illuminator is of a sequence (a specific pattern of on, off, and pulse durations). The sequence transmitted by each illuminator is selected to be different from the sequence transmitted by any other illuminator in the array lidar. Further, each sequence transmitted by any illuminator in the array lidar is a pseudorandom sequence (e.g., pseudorandom binary sequence PRBS) such that a correlation of the received reflections with a sequence other than the corresponding transmitted sequence will result in a low (near zero) peak and an autocorrelation (correlation of the received reflection with the corresponding transmitted sequence) will result in a high (near unity) peak. As such, the resulting reflections may be resolved on the receiver side based on performing a correlation with the transmitted sequences. Although an array of lasers is specifically discussed herein as an exemplary array lidar, the embodiments discussed are not intended to be limited to lasers and apply, as well, to other illuminators (e.g., light emitting diodes (LEDs)).

Figure 1:
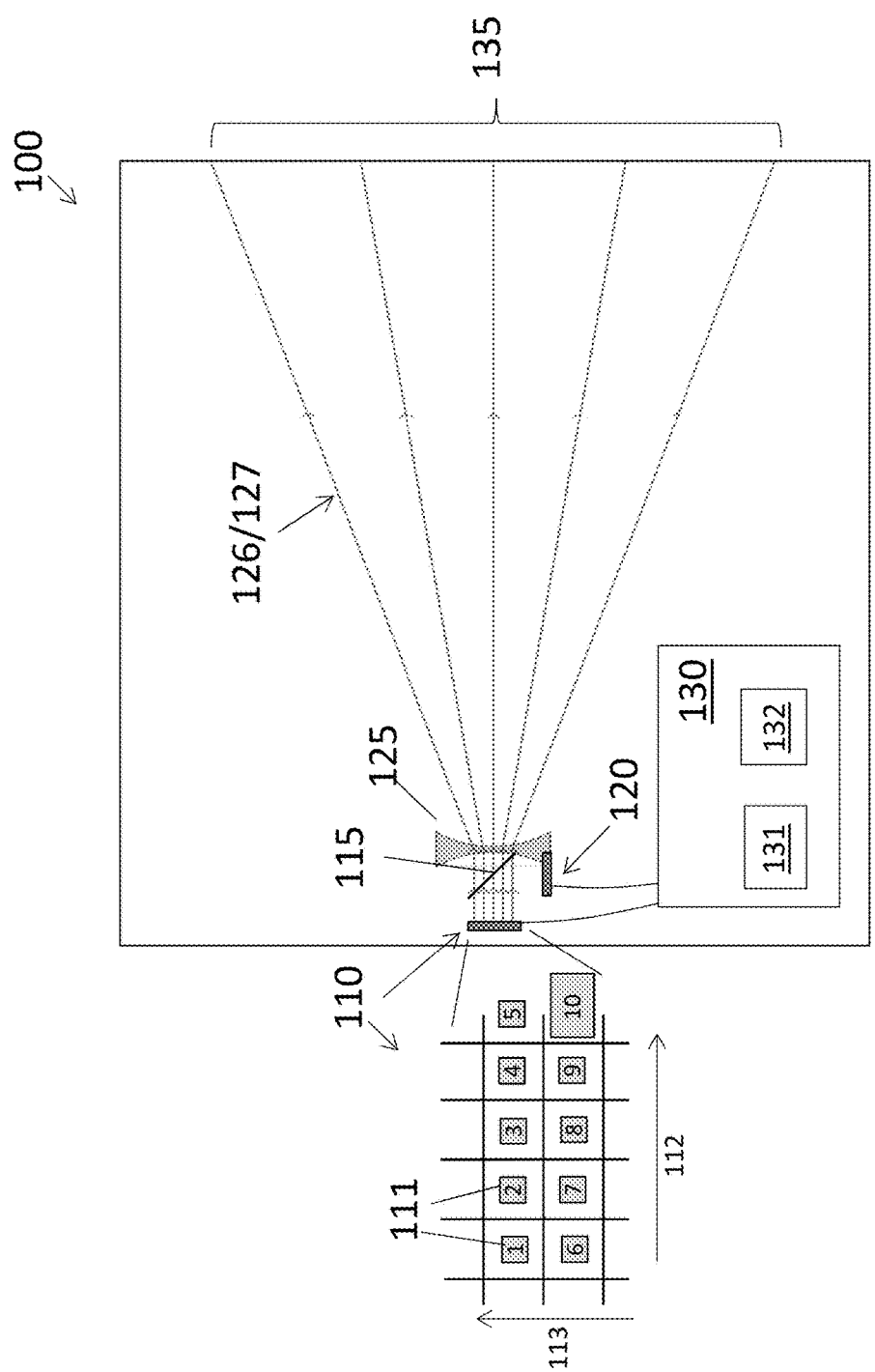
FIG. 1 is a block diagram of an array lidar system according to embodiments.

FIG. 1 is a block diagram of an exemplary array lidar system 100 according to embodiments. The array lidar 110 refers to an arrangement of two or more lasers 111 in an array such that their transmissions make up a field of view 135. The exemplary array lidar system 110 shown in FIG. 1 includes two rows of five lasers 111a through 111e and 111f through 111j. The perspective top-down view illustrating the transmission from the array lidar 110 shows the five laser beams 126 resulting from one row of lasers 111. The exemplary array lidar system 100 shown in FIG. 1 includes a semi-permeable mirror 115 that focuses light from each laser 111 of the array lidar 110 through a lens 125. The lens 125 disperses the laser beam transmitted by each of the lasers 111 of the array lidar 110 across the field of view 135. An optical detector array 120 receives reflections 127 resulting from the transmissions of the array lidar 110. A controller or processing system 130 may include one or more processors 131 and one or more memory devices 132 along with other known components in order to control transmission by each of the lasers 111 of the array lidar 110 as well as processing of received reflections 127 by the optical detector array 120. In alternate embodiments, the processing of received reflections 127 may be done by another processing system 130 that is in communication with the processing system 130 that controls the array lidar 110.

As further discussed below, each of the lasers 111 in the array lidar 110 transmits laser beams 126 comprising a sequence of pulses. As FIG. 1 shows, the array lidar 110 may be used to scan the field of view 135 in both azimuth 112 and elevation 113. Further each sequence of pulses transmitted by each laser 111 is associated with a range to a target in the field of view 135. Thus, the array lidar 110 provides a three-dimensional image in which each reflection 127 resulting from each pulse emission by a laser 111 may be considered a pixel in the image. Accordingly, the spatial resolution of the array lidar system 100 may be increased by increasing the number of lasers 111 in the array lidar 110 or by using two or more array lidar 110 together according to an alternate embodiment. According to an embodiment, the spatial resolution of the array lidar system 100 may also be increased, while using the same number of lasers 111, by transmitting two sequences (e.g., PRBS 220, FIG. 2) with adjacent lasers 111 that result in a third sequence in an area of overlap of the two sequences. By correlating received reflections 127 with the third sequence as well as with the two sequences transmitted by the lasers 111, reflections 127 received from an area between the areas of illumination of the two lasers 111 (the overlapped illuminated area by the two adjacent lasers 111) may be recognized, thereby increasing the spatial resolution. The resolution of the image obtained with the array lidar 110 may therefore be controlled by controlling the transmission (e.g., pulse duration, pulse frequency) by each laser 111.

Figure 2:
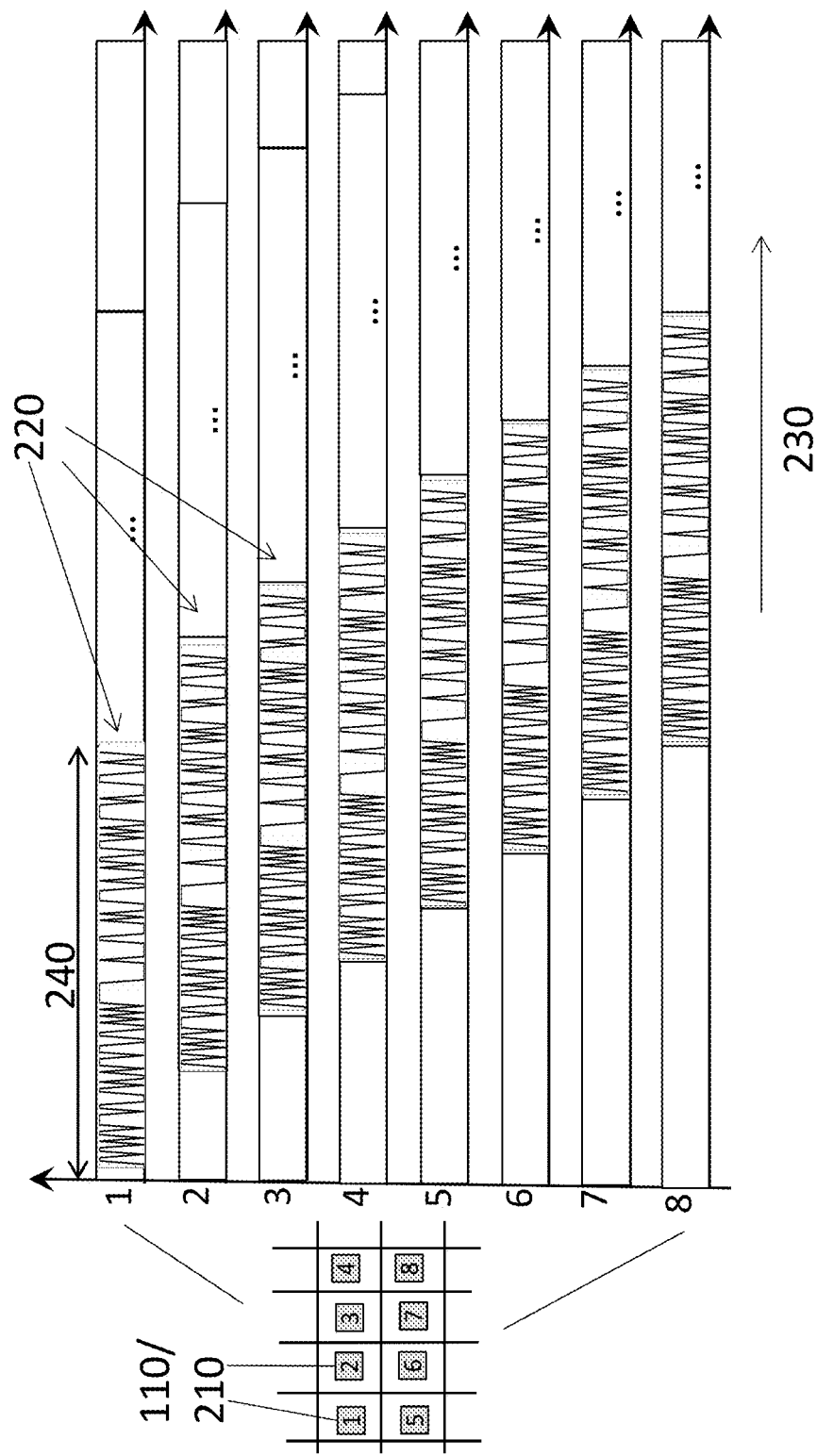
FIG. 2 is an exemplary transmission scheme for an exemplary array lidar according to embodiments.

FIG. 2 is an exemplary transmission scheme for an exemplary array lidar 110 according to embodiments. The exemplary array lidar 110 includes eight lasers 111. Each laser 111 of the array lidar 110 may be an array of vertical-cavity surface-emitting laser (VCSEL) 210, for example. The VCSEL 210 is a type of semiconductor laser diode in which laser beam 126 emission is perpendicular from the top surface rather than being in-plane as for an edge-emitting semiconductor laser, for example. The exemplary array lidar 110 includes eight lasers 111 (VCSELs 210). The transmission by each of the VCSELs 210 is shown over time 220. Each VCSEL 210 emits a pseudorandom binary sequence (PRBS) 220 that is shifted in time from the transmission of every other VCSEL 210 in the array lidar 110, as shown. The time shift for each laser 111 within the array lidar 110 is different and each time shift is longer than the detection range to ensure ambiguity separation.

The PRBS 220 is repeated, as indicated in FIG. 2, such that transmission is continuous and concurrent for all lasers 111 in the array lidar 110. In alternate embodiments, a rest period may be implemented between transmissions (see e.g., FIG. 5). Such a rest period may reduce the heat generated by the array lidar 110, for example. The duration of each sequence (each PRBS 220 repetition) is the scan cycle 240. An exemplary scan cycle 240 may be less than 40 milliseconds (msec), for example. In the exemplary embodiment shown in FIG. 2, the same PRBS 220 is transmitted by each laser 111 of the array lidar 110. In alternate embodiments, each PRBS 220 transmitted by each laser 111 may be different (rather than the same PRBS 220 that is time-shifted) or may have a different frequency. In other embodiments, the PBRS 220 transmitted by different lasers 111a through 111d of the array lidar 110 may be of different lengths (see e.g., FIG. 5). In FIG. 2, for example, rather than transmitting PBRS 220 of the same length, laser 111-1 may transmit a sequence of 100 microseconds (ms) while laser 111-2 transmits a sequence of 150 ms. The length of a subsequent sequence may be decreased for purposes of power management or increased to increase range resolution. According to the embodiments herein, reflections 127 resulting from the concurrent transmissions are resolved in a straight-forward manner because a PRBS 220 is time-shifted or different PRBS 220 are transmitted altogether. This is because, by definition, any PRBS is a binary sequence whose autocorrelation function has only two values. The systems and method according to the embodiments herein take advantage of this to resolve reflections 127 resulting from one laser 111 emitting a PRBS 220 with another emitting a different or time-shifted version of the PRBS 220, as further discussed below. When more than one array lidar 110 is used, each array lidar 110 may transmit a different PRBS 220 (or each laser 111 of each array lidar 110 may transmit a different PRBS 220).

Figure 3:
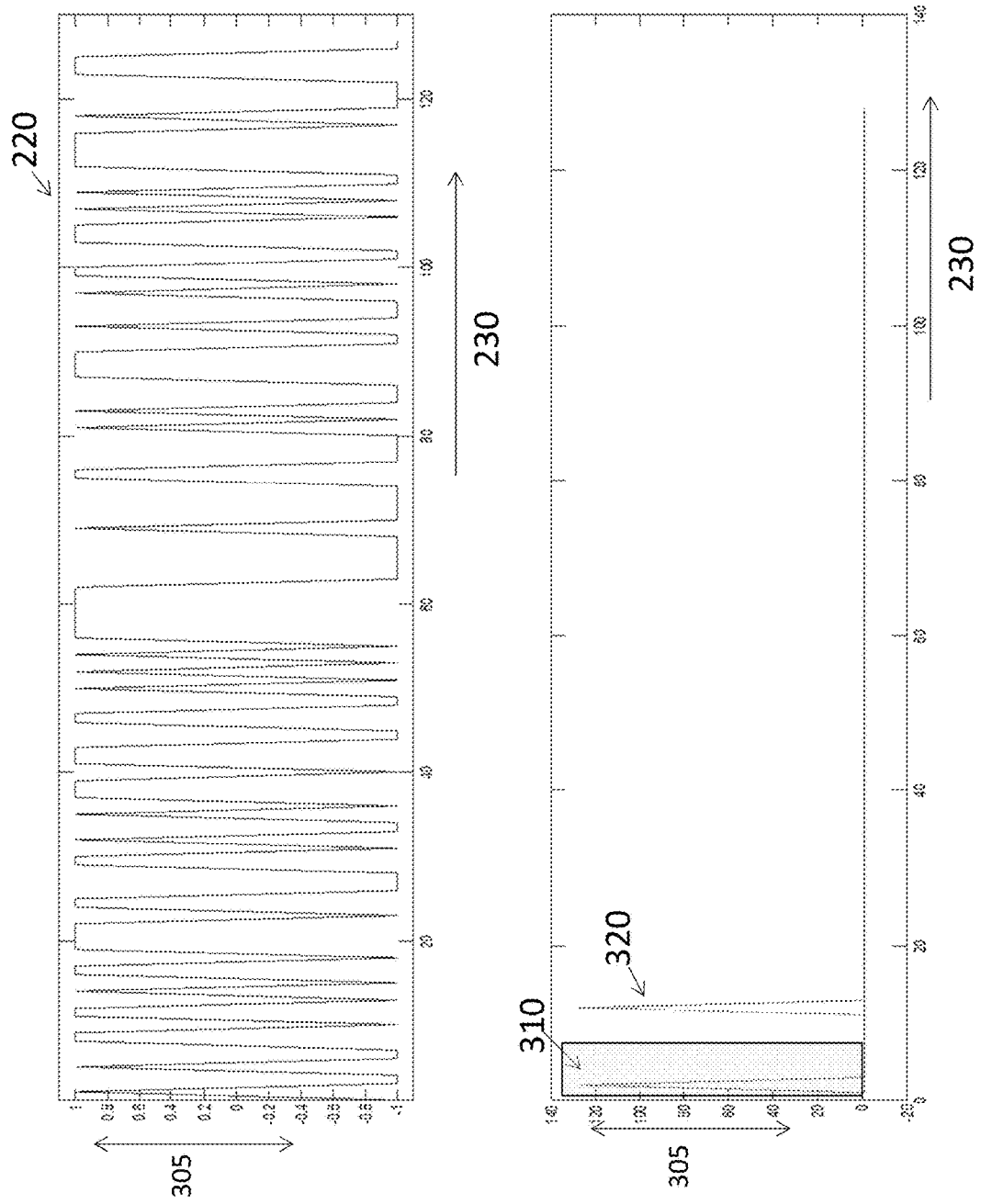
FIG. 3 shows an exemplary pseudorandom binary sequence (PRBS) and resulting autocorrelation result according to an embodiment.

FIG. 3 shows an exemplary PRBS 220 and resulting autocorrelation result 320 according to an embodiment. The PRBS 220 is shown with time 230 and amplitude 305 indicated on perpendicular axes. The duration of the PRBS 220, t, defines range R resolution. The maximum range is given by:

$$R = \frac{t*c}{2} \quad [\text{EQ. 1}]$$

With speed of light c given by $3*10^8$ meters/second (m/s), EQ. 1 simplifies to:

$$R = t_{ns}*0.15 \text{ m} \quad [\text{EQ. 2}]$$

That is, the duration t in nanoseconds $t_{ns}$ gives range in meters (m) according to EQ. 2. Thus, for example, when the duration t of the sequence is 0.5 microseconds, the maximum range at which a target may be detected is 75 m, according to EQ. 2. The autocorrelation result 310 is shown in FIG. 3, as well. The received signal at each detector of the optical detector array 120 is correlated with each PRBS 220 sequence that was transmitted by any laser 111 of the array lidar 110. When a reflection 127 resulting from transmission of the PRBS 220 is correlated with the (correct) PRBS 220 (i.e., the PRBS 220 that resulted in the reflection 127), the autocorrelation result 310 is obtained. This autocorrelation result 310 is associated with one of the detectors of the optical detector array 120. Another autocorrelation result 320 associated with the same detector of the optical detector array 120 is shown in FIG. 3. This autocorrelation result 320 may be associated with autocorrelation of a reflection 127 resulting from transmission of the PRBS 220 by another laser 111 (at a later than the time of transmission of the PRBS 220 that results in the autocorrelation result 310).

Figure 4:
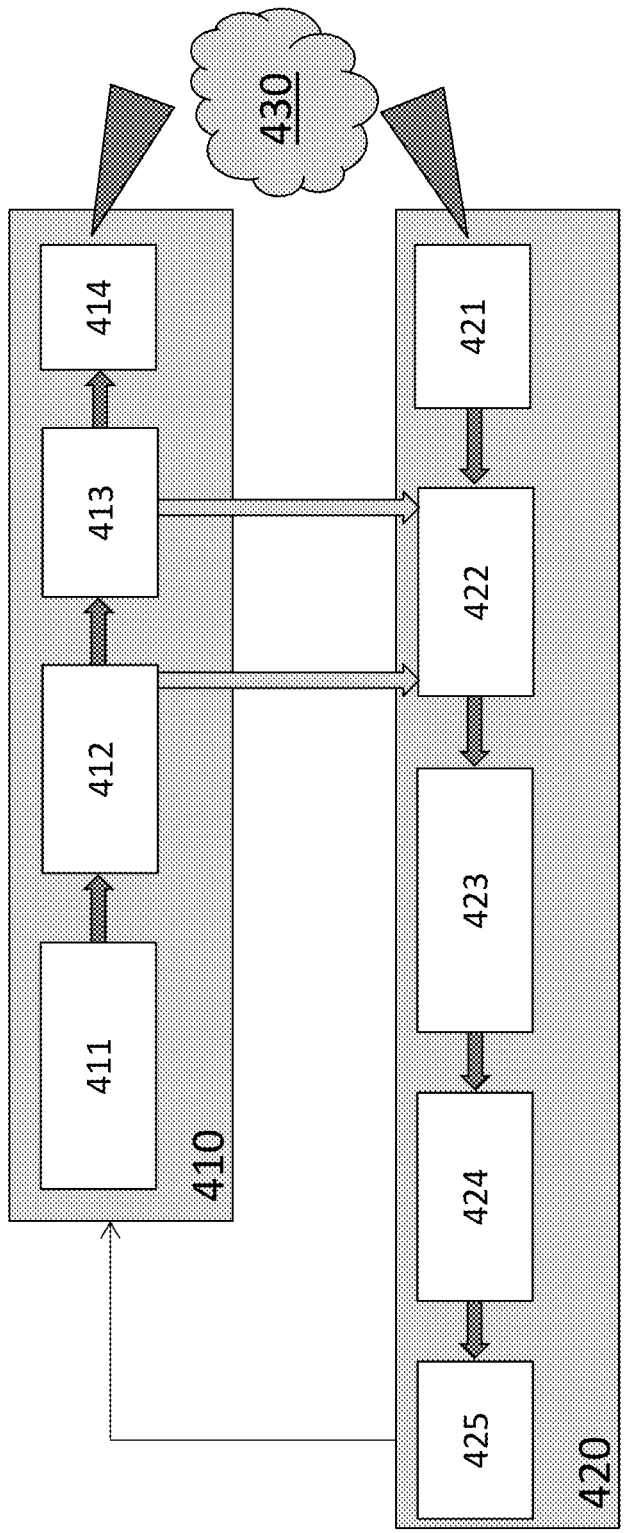
FIG. 4 shows processes performed by the transmitter section and receiver section of the array lidar system according to an embodiment.

FIG. 4 shows processes performed by the transmitter section 410 and receiver section 420 of the array lidar system 100 according to an embodiment. The functions of the transmitter section 410 and receiver section 420 may be performed by one or more processing systems 130 using processors 131 and memory devices 132. That is, one or more processing systems 130 that control the array lidar 110 and optical detector array 120 may be used alone or in communication with other processing systems 130 in a known distributed manner. Thus, the grouping of the functionalities as in FIG. 4 is not intended to limit the hardware, software, and firmware that may be used to implement the functionality. The reflections 127 received by each detector of the optical detector array 120 may be processed individually or together according to various embodiments discussed below.

At block 411, generating a pseudorandom sequence involves generating a PRBS 220, as shown in FIG. 2, for example. According to alternate embodiments, in which different PRBS 220 are transmitted by each laser 111 rather than a time-delayed version of the same PRBS 220, the process at block 411 includes generating two or more different PRBSs 220. When more than one array lidar system 100 shares processors (130), the array lidar 110 associated with each array lidar system 100 may transmit a different PRBS 220. Generating a pulse burst, at block 412, involves selecting the scan cycle 240. Implementing a delay line and de-multiplexer, at block 413, refers to each set of pulse bursts supplied to each laser 111 of the array lidar 110 having a different delay associated with the PRBS 220. De-multiplexing is done in order to facilitate providing each differently delayed PRBS 220 to a different laser 111 of the array lidar 110 (of one or more array lidar systems 100) at block 414. As FIG. 4 indicates, the pulse burst (generated at block 412) and the delay information (from block 413) is provided to the receiver section 420, as further discussed below. The transmissions of pulse bursts from each laser 111 of the array lidar 110 are reflected from targets 430.

At block 421, receiving the reflections 127 includes using the optical detector array 120. As noted previously, the processes indicated for the receiver section 420 may be done collectively for all received reflections 127 or may be distributed and associated with each detector of each optical detector array 120 of each array lidar system 100, for example. Correlating the reflections 127 with each of the time-shifted pulse bursts (220) (associated with each of the laser 111 transmissions), at block 422, facilitates detecting and classifying targets at block 423. The reflection 127 will be associated with a given laser 111 transmission based on the correlation between the PRBS 220 transmitted by that laser 111 and the reflection 127 being maximal (being an autocorrelation). Extracting the position of detected targets, at block 424, involves using the time shift associated with the pulse burst for which the correlation (at block 422) was maximum, because the time shift corresponds with range to the target. At block 425, providing the information obtained in the previously performed processes includes providing the information to a central controller or processor of the platform (e.g., vehicle) on which the array lidar system 100 is installed or combining the received information from all the detectors of the optical detector array 120. The central processor may aggregate or synthesize the information from the different detectors of the optical detector array 120 with information from other sensors (e.g., radar, camera) to make decisions related to the platform (e.g., collision avoidance). The receiver section 420 associated with each detector of the optical detector array 120 may be coupled such that the processing discussed above is done on a combination of received reflections 127. As indicated by FIG. 4, information obtained from the optical detector array 120 may be used to control the array lidar 110.

As noted above, the processing by the receiver section 420 may be done on a combination of reflections 127 received by different detectors of the optical detector array 120. In addition, the information obtained by processing one or more reflections 127, at block 425, may be used to control subsequent transmissions. For example, based on the amplitude 305 of the autocorrelation result (310, 320), the power of the next PRBS 220 transmitted by the corresponding laser 111 may be increased or decreased. The PRBS 220 may be made longer or shorter based on the autocorrelation result (310, 320), as well. As pulse duration decreases, range accuracy increases. Thus, once a target 430 has been identified at a given range that is less than the maximum range facilitated by the current PRBS 220 duration, the duration may be decreased to increase range accuracy for that target 430. When the same shorter PRBS 220 is transmitted by two or more lasers 111, the reflections 127 may be averaged or aggregated on the receiver side 420. Aggregating received reflections 127 based on short PRBS 220 may result in long-term correlation with a set of transmitted PRBS 220.

Figure 5:
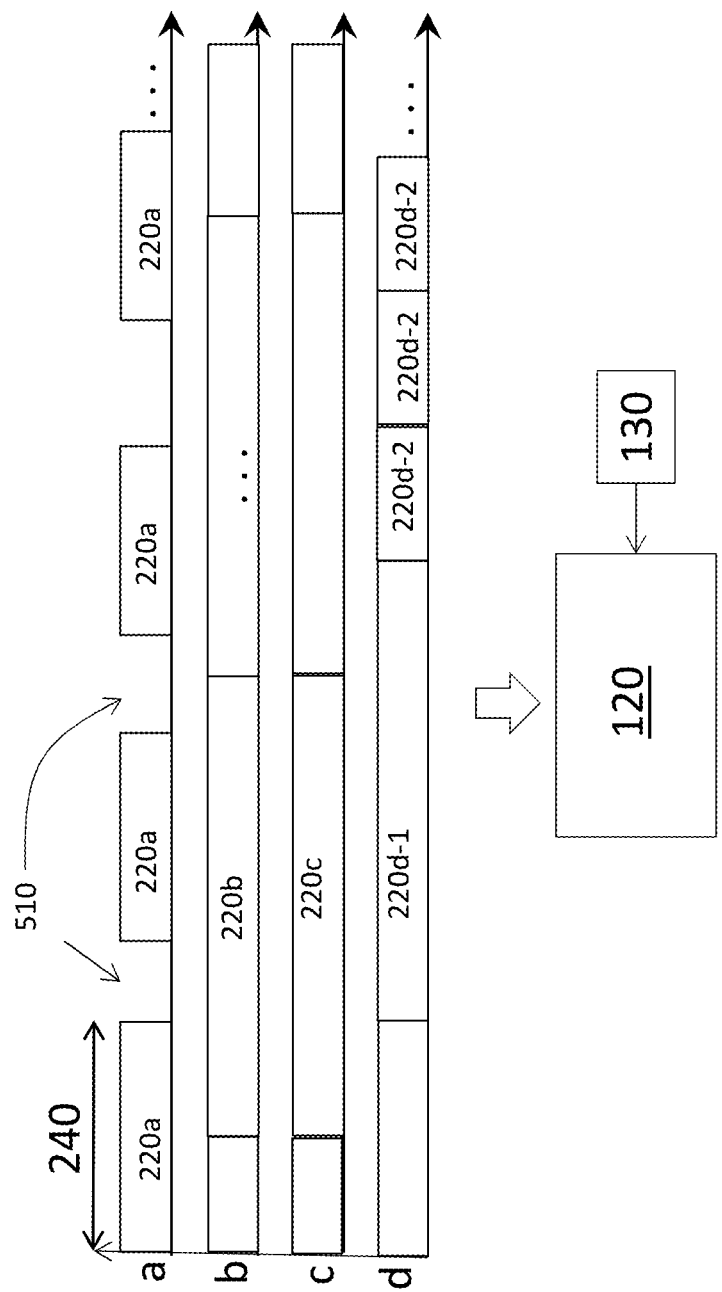
FIG. 5 illustrates exemplary transmissions of an array lidar system according to embodiments.

FIG. 5 illustrates exemplary transmissions of an array lidar system 100 according to embodiments. Transmissions associated with four lasers 111a, 111b, 111c, and 111d are shown. Each PRBS 220a associated with laser 111a is relatively short, and a resting period is inserted between successive PRBSs 220. The processing of the resulting reflections 127 at each detector of the optical detector array 120 may be according to one of several embodiments. According to one exemplary embodiment, the correlation may be performed between an aggregated set of PRBS 220a and a set of reflections 127. According to another embodiment, the reflections 127 may be averaged and correlated with one PRBS 220. In yet other embodiments, the same PRBS 220a may not be transmitted after each rest period.

As FIG. 5 indicates, lasers 111b and 111c transmit simultaneously. As such, in an area in which PRBS 220b and PRBS 220c overlap, a third PRBS that is a combination of PRBS 220b and PRBS 220c is reflected. Thus, correlation of received reflections 127 must include correlation with the third PRBS, as well, in order to distinguish the reflections 127 resulting from the overlap from reflections 127 resulting from either PRBS 220b or PRBS 220c alone. As FIG. 5 also indicates, the length of the sequences transmitted by laser 111d is reduced. According to an exemplary embodiment, processing of the reflection 127 resulting from transmission of PRBS 220d-1 may indicate that the autocorrelation result exceeds a threshold amplitude. In this case, the subsequent transmissions by laser 111d may be of shorter duration (PRBS 220d-2). In alternate embodiments, the opposite may be true. Based on the received reflections 127 falling below a threshold signal-to-noise ratio (SNR), the length of subsequently transmitted sequences may be increased.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An array lidar system, comprising:
   a first illuminator configured to transmit a first pseudorandom sequence of pulses, the first pseudorandom sequence of pulses resulting in first reflections;
   a second illuminator configured to transmit a second pseudorandom sequence of pulses, the second pseudorandom sequence of pulses being transmitted at least partly concurrently with transmission of the first pseudorandom sequence of pulses, the second pseudorandom sequence of pulses resulting in second reflections, wherein the first pseudorandom sequence of pulses and the second pseudorandom sequence of pulses are unmixed, and the first pseudorandom sequence of pulses and the second pseudorandom sequence of pulses are transmitted only partly concurrently with a time shift therebetween based on the first pseudorandom sequence of pulses and the second pseudorandom sequence of pulses being a same sequence of pulses; and a receiver configured to receive the first reflections and the second reflections and associate the first reflections with the first illuminator based on a result of correlating the first reflections with the first pseudorandom sequence of pulses and a result of correlating the first reflections with the second pseudorandom sequence of pulses, the receiver including an optical detector array and a processor.

2. The system according to claim 1, wherein a length of the first pseudorandom sequence of pulses is different than a length of the second pseudorandom sequence of pulses.

3. The system according to claim 1, wherein the correlation of the first reflections with the first pseudorandom sequence of pulses results in a peak that is higher than a peak that results from the correlation of the first reflections with the second pseudorandom sequence of pulses.

4. The system according to claim 1, wherein the second pseudorandom sequence of pulses is a time-shifted version of the first pseudorandom sequence of pulses.

5. The system according to claim 1, wherein a frequency of the first pseudorandom sequence of pulses is different than a frequency of the second pseudorandom sequence of pulses.

6. The system according to claim 1, wherein an overlap of the first pseudorandom sequence of pulses and the second pseudorandom sequence of pulses in an area results in a third pseudorandom sequence of pulses causing reflections from the area.

7. The system according to claim 6, wherein the receiver receives third reflections from the area resulting from the third pseudorandom sequence of pulses and performs correlation using the third pseudorandom sequence of pulses.

8. The system according to claim 1, wherein the first pseudorandom sequence of pulses and the second pseudorandom sequence of pulses are different than pseudorandom sequences of pulses transmitted concurrently by a second array lidar system.

9. The system according to claim 1, wherein a power or length of a subsequent pseudorandom sequence of pulses transmitted by the first illuminator is changed based on processing the first reflections.

10. The system according to claim 1, wherein based on the first illuminator transmitting a series of the first pseudorandom sequence of pulses, the reflections resulting from the series are correlated with an aggregate of the series.

11. The system according to claim 1, wherein based on the first illuminator transmitting a series of the first pseudorandom sequence of pulses, the reflections resulting from the series are averaged and correlated with first pseudorandom sequence of pulses.

12. A method of performing ranging and detection with an array lidar system, the method comprising:
transmitting a first pseudorandom binary sequence of pulses (PRBS) using a first illuminator;
transmitting a second PRBS using a second illuminator, the transmitting the first PRBS and the transmitting the second PRBS being at least partly concurrent, wherein the first PRBS and the second PRBS are transmitted unmixed, and the first PRBS and the second PRBS are transmitted only partly concurrently with a time shift therebetween based on the first pseudorandom sequence of pulses and the second pseudorandom sequence of pulses being a same sequence of pulses;
receiving first reflections resulting from the transmitting the first PRBS;
receiving second reflections resulting from the transmitting the second PRBS; and
associating the first reflections with the first illuminator based on a result of correlating the first reflections with the first PRBS and a result of correlating the first reflections with the second PRBS.

13. The method according to claim 12, wherein the associating the first reflections with the first illuminator includes determining that an amplitude of the result of correlating the first reflections with the first PRBS is greater than an amplitude of the result of correlating the first reflections with the second PRBS.

14. The method according to claim 12, further comprising adjusting a power or length of a subsequent PRBS transmitted by the first illuminator based on processing the first reflections.

15. The method according to claim 12, further comprising transmitting a series of the first PRBS using the first illuminator.

16. The method according to claim 15, further comprising correlating the reflections resulting from the series with an aggregate of the series.

17. The method according to claim 15, further comprising averaging the reflections resulting from the series to obtain an average and correlating the average with the first PRBS.

* * * * *